United States Patent
Kim (12) 
(10) Patent No.: US 6,707,478 B2
(45) Date of Patent: Mar. 16, 2004

(54) OSD CONTROLLER ASSEMBLY AND ASSEMBLING PROCESS IN A DISPLAYING APPARATUS

(75) Inventor: Ju-Hwan Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 09/983,347

(22) Filed: Oct. 24, 2001

(65) Prior Publication Data

US 2002/0080113 A1 Jun. 27, 2002

(30) Foreign Application Priority Data

Dec. 27, 2000 (KR) .......................... 2000/83362

(51) Int. Cl.[7] ................................. G09G 5/00
(52) U.S. Cl. .................. 345/905; 361/627; 361/632
(58) Field of Search ................. 361/627–632, 361/679–686, 720, 748, 760, 761; 345/1.3, 5, 905

(56) References Cited

U.S. PATENT DOCUMENTS 5,552,958 A * 9/1996 Seto et al. ................. 361/683
6,020,824 A * 2/2000 Tamura et al. ........... 340/815.5
6,535,261 B1 * 3/2003 Anno et al. ................ 349/147

FOREIGN PATENT DOCUMENTS

| JP | hei8-180766 | 7/1996 |
| JP | hei11-40001 | 2/1999 |
| KR | 1988-020552 | 11/1988 |
| KR | 1990-001265 | 1/1990 |
| KR | 1997-019634 | 5/1997 |
| KR | 1998-065324 | 10/1998 |

* cited by examiner

Primary Examiner—Steven Saras
Assistant Examiner—Uchendu O. Anyaso
(74) Attorney, Agent, or Firm—Robert E. Bushnell, Esq.

(57) ABSTRACT

A displaying apparatus includes a front cover, a rear cover coupled to the first cover, and an LCD panel disposed between the front cover and the rear cover. The displaying apparatus includes a slot formed on the front cover, at least one press knob disposed within the slot, a panel bracket coupled to the front cover at the rear of the LCD panel to support the LCD panel, and a main printed circuit board electrically connected to the LCD panel and supported by the panel bracket. The displaying apparatus includes a support bracket having a coupling member disposed between the front cover and the LCD panel and facing the front cover so as to be coupled to any one of the front cover, the LCD panel, and the panel bracket. A knob support is formed on one end of the coupling portion, and an on screen display PCB support is formed on another end of the coupling portion. An on screen display (OSD) printed circuit board (PCB) is supported by the OSD PCB support in a direction perpendicular to the knob support. A switch is installed in the OSD PCB and is operated by a press knob moving in a direction perpendicular to the knob support.

21 Claims, 9 Drawing Sheets

OSD CONTROLLER ASSEMBLY AND ASSEMBLING PROCESS IN A DISPLAYING APPARATUS

CLAIM OF PRIORITY

This application makes reference to, incorporates the same herein, and claims all benefits accruing under 35 U.S.C. §119 from an application for DISPLAY earlier filed in the Korean Industrial Property Office on Dec. 27, 2000 and there duly assigned Serial No. 83362/2000 by that Office.

BACKGROUND OF THE INVENTION

1. Field of the Invention

The present invention relates in general to an on screen display (OSD) controller assembly mounted in a displaying apparatus, and more particularly, to an OSD controller assembly including a knob support and a printed circuit board support formed in a monolithic structure.

2. Description of the Related Art

OSD controller units have been mounted in a displaying apparatus, such as a cathode ray tube (CRT) monitor or a liquid crystal display (LCD) monitor, to allow a user to control various OSD functions of the displaying apparatus. Typically, the OSD controller unit is disposed in a space between a front cover and a rear cover of the LCD monitor. Since the LCD monitor is minimized in size and in thickness, the space for installing the OSD controller unit within the LCD monitor becomes smaller and narrower, and the OSD controller unit is required to be compact and slim to be mounted within the limited space of the LCD monitor. The conventional OSD controller unit, however, is disadvantageous due to the large number of bulky components compared to the narrow and small space between the front cover and the rear cover.

The LCD monitor mounted with the conventional OSD controller unit is shown in FIGS. 5 through 8. The LCD monitor includes a cover casing 101 defining an outer appearance of the LCD monitor, an LCD panel 103 mounted within cover casing 101 for displaying a visual image thereon, and a stand member 105 supporting a lower part of cover casing 101.

Cover casing 101 includes a front cover 111, a rear cover 113 coupled to a rear side of front cover 111, and a space formed between front cover 111 and rear cover 113 for accommodating therein LCD panel 103. Front cover 111 is formed with an opening 121 through which a screen of LCD panel 103 displaying the visual image is exposed to an outside of the LCD monitor.

Figure 6:
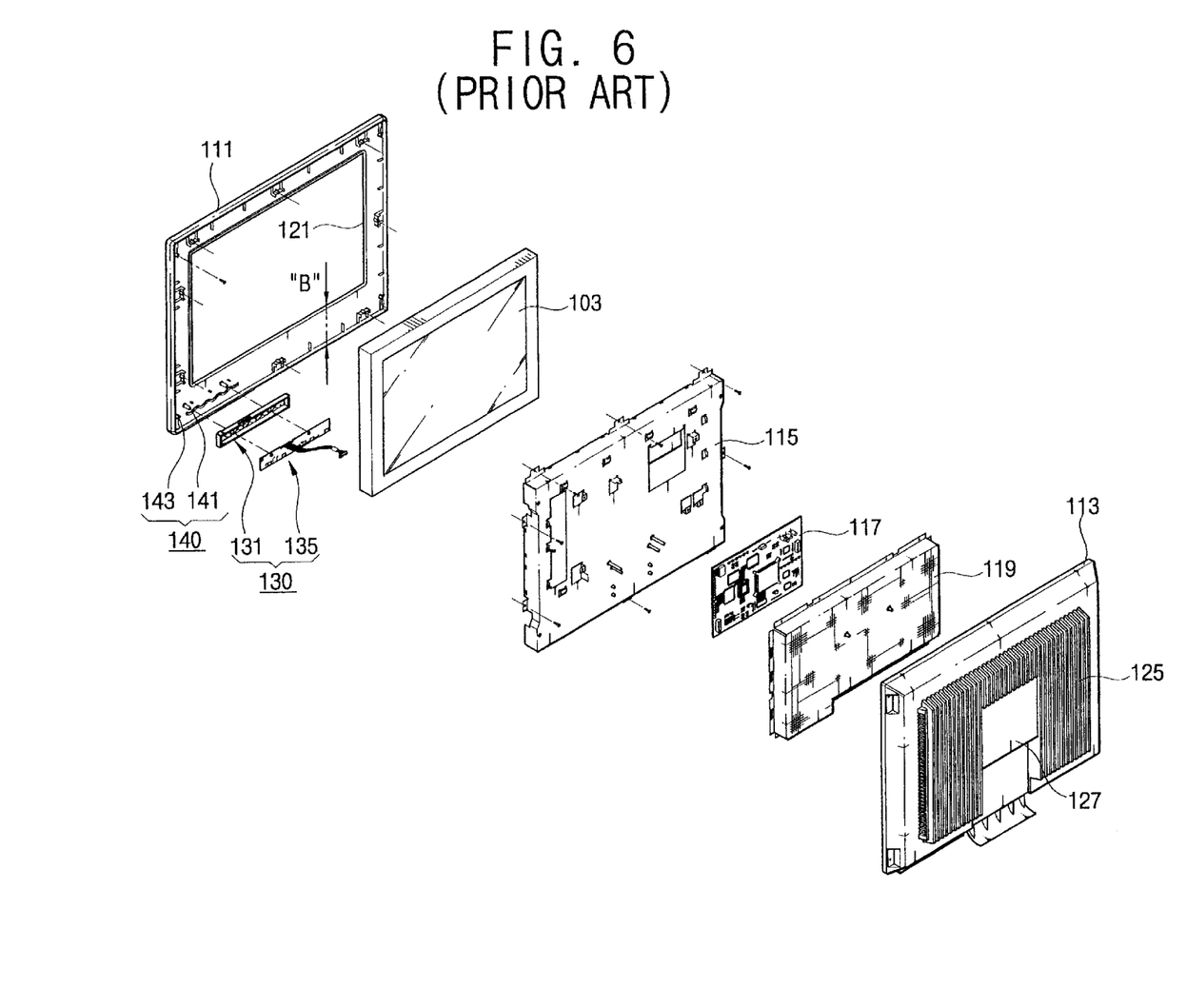
FIG. 6 is an exploded perspective view of the displaying apparatus of FIG. 5.

In FIG. 6, rear cover 113 is formed with air inlet slots 125 through which outdoor air flows into an inside of cover casing 101, and a terminal receptacle 127 providing a passage for a variety of peripherals and connection wires. Within cover casing 101 are mounted a panel bracket 115 supporting LCD panel 103, a main printed circuit board (PCB) assembly 117 transmitting electric signals, such as video signals for the visual images, to LCD panel 103, and a main PCB cover 119 protecting main PCB assembly 117.

Panel bracket 115 is coupled to front cover 111 to enclose four circumferential sides and a rear side of LCD panel 103 and to support LCD panel 103. Main PCB assembly 117 is coupled to a rear surface of panel bracket 115, and main PCB cover 119 is coupled to panel bracket 115 to enclose main PCB assembly 117.

The LCD monitor is provided with an OSD controller unit 130 allowing the user to control the OSD functions, such as brightness, size, and position of the screen of LCD panel 103 and to adjust color and vividness of the visual images, etc. On a lower portion of cover casing 101 is provided an OSD controller coupler 140 formed on an inner side of front cover 111 and coupled to OSD controller unit 130.

OSD controller coupler 140 includes a plurality of knob passing holes 141 and a screw-coupling boss 143 which are formed on a lower portion of front cover 111 below opening 121, and screw-coupling boss 143 protrudes from an inner side of front cover 111 adjacent to knob passing hole 141 toward rear cover 113. A thread is formed on a circumferential inner surface of screw-coupling boss 143.

Figure 7:
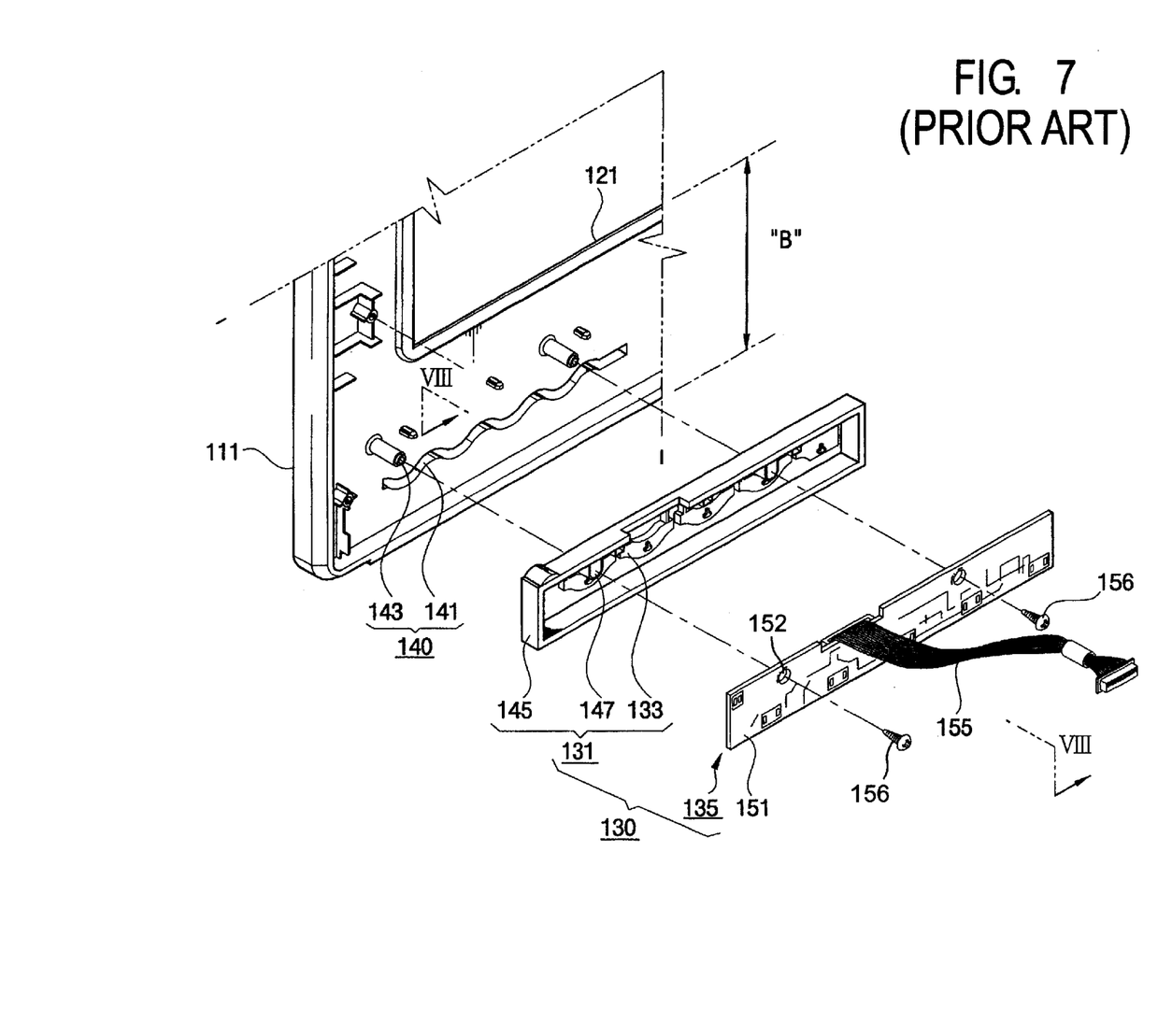
FIG. 7 is an enlarged perspective view showing a main portion of the OSD controller unit of FIG. 6.

OSD controller unit 130, as illustrated in FIGS. 6 and 7, includes a knob assembly 131 coupled to OSD controller coupler 140 and an OSD PCB assembly 135 coupled to a rear side of knob assembly 131. Knob assembly 131 includes a knob support frame 145 having a rectangular shape with predetermined width and length, a boss inserting hole 147 formed on knob support frame 145 corresponding to screw-coupling boss 143 to allow screw-coupling boss 143 to be inserted into boss inserting hole 147, and a plurality of press knobs 133 integrally formed on knob support frame 145 so as to be elastically supported by knob support frame 145.

Knob assembly 131 is assembled to front cover 111 when screw-coupling boss 143 of OSD controller coupler 140 is inserted into boss inserting hole 147 of knob assembly 131. When knob assembly 131 is coupled to OSD controller coupler 140, press knob 133 is inserted into knob passing hole 141 of OSD controller coupler 140 and protrudes from a front outer surface of front cover 111.

OSD PCB assembly 135 includes an OSD PCB 151 on which conductors are printed, a plurality of switches 153 (FIG. 8) provided lengthwise on a peripheral surface of OSD PCB 151 and in contact with the press knob 133, and a connection cable 155 extending from OSD PCB 151 so as to be coupled to main PCB assembly 117 for transmitting signals from OSD PCB 151 to main PCB assembly 117.

OSD PCB 151 and knob supporting frame 145 are the same in size and shape. A screw passing hole 152 (see FIG. 7) is formed on OSD PCB 151 in correspondence to screw-coupling boss 143. OSD PCB assembly 135 is assembled into knob assembly 131 by a screw 156 which passes through screw passing hole 152 so as to be coupled to a free end of screw-coupling boss 143 which passes through boss inserting hole 147 in knob support frame 145.

OSD PCB 151 is disposed perpendicular to a direction in which press knobs 133 move to contact respective switches 153 mounted on OSD PCB 151 (see FIG. 6). Because OSD PCB 151 is disposed parallel to front cover 111, LCD panel 103, and knob supporting frame 145, front cover 111 of the LCD monitor is required to have a height B large enough to provide room for OSD PCB 151 and knob support frame 145. Moreover, LCD panel 103 is disposed spaced-apart from a bottom of cover case 101 by the height B since the LCD monitor needs to provide a large volume of space for OSD controller unit 130.

Figure 8:
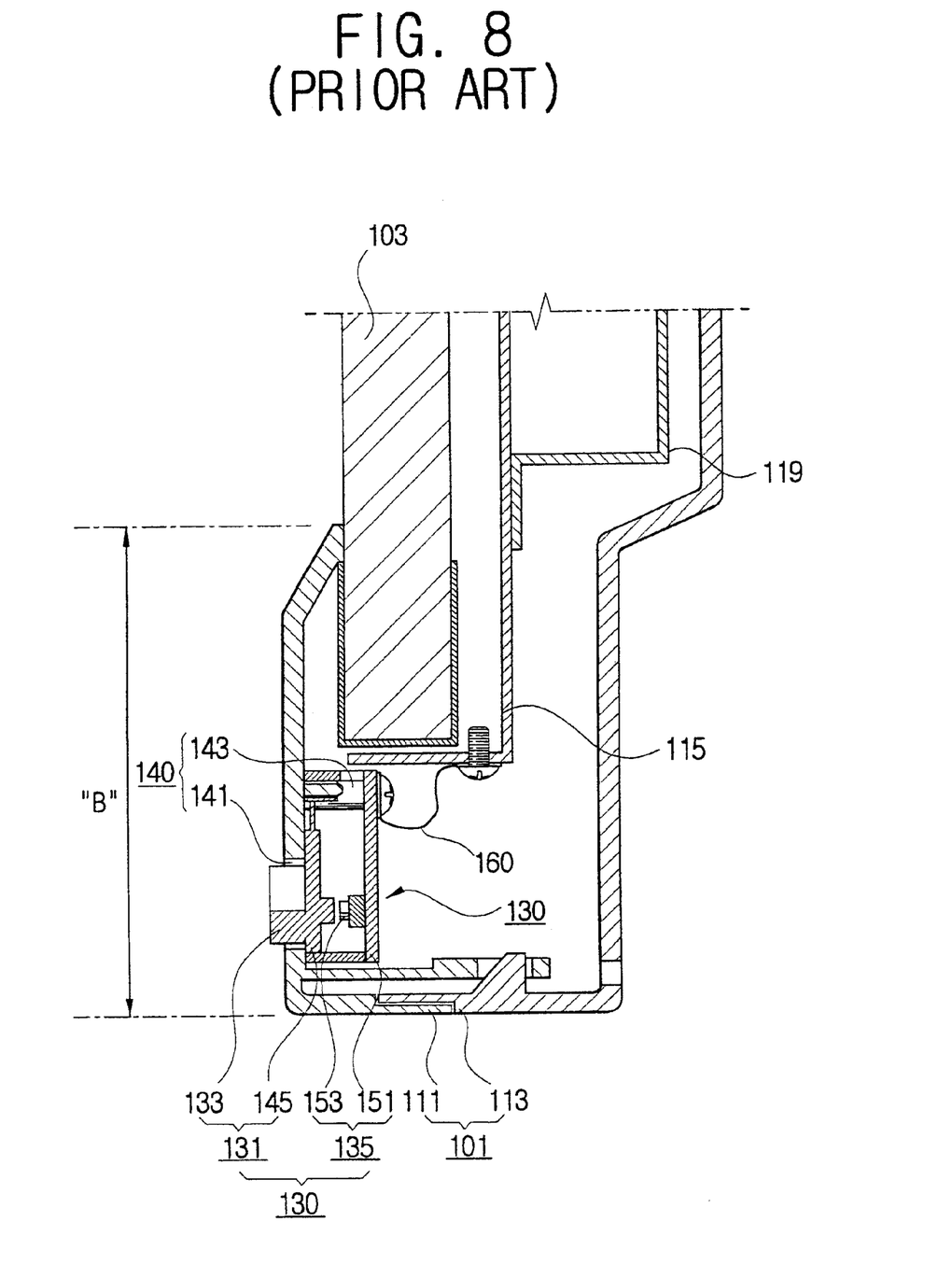
FIG. 8 is a partial cross-sectional view taken along a line VIII—VIII of FIG. 7.

OSD controller unit 130 is provided with a ground wire 160 for protecting the displaying apparatus from being damaged due to static electricity transmitted from the outside of the displaying apparatus through knob passing hole 141 as shown in FIG. 8. Ground wire 160 connects OSD PCB 151 of OSD controller coupler 130 to panel bracket 115 which functions as a ground. With this configuration, the static electricity transmitted from the outside of the displaying apparatus is discharged to panel bracket 115 through ground wire 160.

The conventional displaying apparatus, however, is required to provide a space corresponding to a height of knob supporting frame 145 and OSD PCB 151 for securing knob supporting frame 145 and OSD PCB 151 to the lower portion of front cover 111, since OSD PCB 151 of OSD PCB assembly 135 is coupled to knob supporting frame 145 in parallel and coupled to front cover 111 in perpendicular to the direction of movement of press knob 133.

Accordingly, it is disadvantageous to the outer appearance and the size of the displaying apparatus since the lower portion of the front cover 111 has a width greater than the height B of the knob supporting frame 145 and the OSD PCB assembly 135, as shown in FIGS. 5 thru 8. Moreover, when the OSD controller coupler 140 is assembled, the knob assembly 131 and the OSD PCB assembly 135 need to be manually coupled to the OSD controller 140 coupler by screws. Furthermore, the ground wire 160 is prepared additionally and connected between the OSD PCB assembly 135 and the panel bracket 115 by screws. Therefore, the number of complicated components increases, and the manufacturing cost of the conventional displaying apparatus increases due to the complicated manufacturing process.

It is an object of the invention to provide an improved OSD controller assembly mounted in a displaying apparatus.

SUMMARY OF THE INVENTION

It is an object to provide an improved OSD controller assembly mounted in a displaying apparatus.

It is another object to provide an OSD controller assembly able to reduce the number of components.

It is still another object to provide an OSD controller assembly able to reduce the height of a peripheral portion of a front cover of the displaying apparatus.

It is yet another object to provide an OSD controller assembly able to be assembled into a slim displaying apparatus with a simplified process.

It is still yet another object to provide an OSD controller assembly occupying a reduced space within a displaying apparatus.

It is also an object to provide an OSD controller assembly able to make a displaying apparatus slim and compact.

It is a further object to provide an OSD controller assembly formed with a terminal contacting a ground without a ground wire when assembled.

These and other objects of the present invention may be achieved by providing a displaying apparatus mounted with an improved OSD controller assembly. The displaying apparatus includes an LCD panel, a front cover disposed in front of the LCD panel, at least one press knob formed along the circumference thereof, a panel bracket coupled to the front cover on a rear side of the LCD panel and supporting the LCD panel, and an OSD controller assembly mounted between the front cover and the LCD panel and having a support bracket made in a monolithic structure.

The support bracket includes a coupling member, a knob support extending from the coupling member, and an OSD PCB support extending from another end of the coupling member. The coupling member is coupled to any one of the front cover, the LCD panel, and the panel bracket when inserted between the front cover and the LCD panel. The knob support supports the press knob. The OSD PCB support supports a PCB unit including an OSD printed circuit board (PCB) which is disposed along a bottom side of the LCD panel, perpendicular to the front cover, and parallel to the direction of movement of the press knob contacting a corresponding switch mounted on the OSD PCB.

The coupling member of the support bracket is in the shape of an "∩", both ends of which are elastically inserted between the front cover and the LCD panel and biased outwardly. The knob support and the PCB support are formed on both elastically outwardly biased ends of the coupling member, thereby allowing a support bracket to be fixed between the front cover and the LCD panel without a screw, etc.

The OSD PCB support includes a pair of holders extending from one elongated end of the coupling member and, alternatively, formed along the one elongated end of the coupling member. The holders are spaced-apart from each other and inwardly biased to support and hold the OSD PCB when receiving a peripheral portion of the OSD PCB. The PCB is disposed horizontally along, and parallel with, the bottom side of the LCD panel.

A ground terminal is formed between the OSD PCB support and the coupling member, and is disposed to contact the panel bracket, thereby preventing the displaying apparatus from being damaged due to static electricity transmitted from the outside of the displaying apparatus without coupling an additional and separate ground wire between the OSD PCB and the panel bracket. The OSD PCB support holds an insulation area of the PCB, thereby preventing the OSD PCB from being damaged due to the static electricity.

The support bracket is press-molded from a single metal plate. After the knob support and the OSD PCB support are formed on respective opposite ends of the support bracket, the support bracket is bent about a central line disposed between the knob support and the OSD PCB support to form the coupling member having the "∩" shape. The support bracket is inserted between the LCD panel and the front cover after the knobs are held by the knob support. The OSD PCB is inserted into the OSD PCB support so as to be disposed parallel to the direction of movement of the knob. Preferably, a plurality of knobs is provided along the lower circumference of the front cover, and the switches are disposed in corresponding positions so as to be in contact with, and activated by, the press knob.

BRIEF DESCRIPTION OF THE DRAWINGS

A more complete appreciation of this invention, and many of the attendant advantages thereof, will be readily apparent as the same becomes understood by reference to the following detailed description when considered in conjunction with the accompanying drawings in which like reference symbols indicate the same or similar components, wherein.

DETAILED DESCRIPTION OF THE INVENTION

Figure 1:
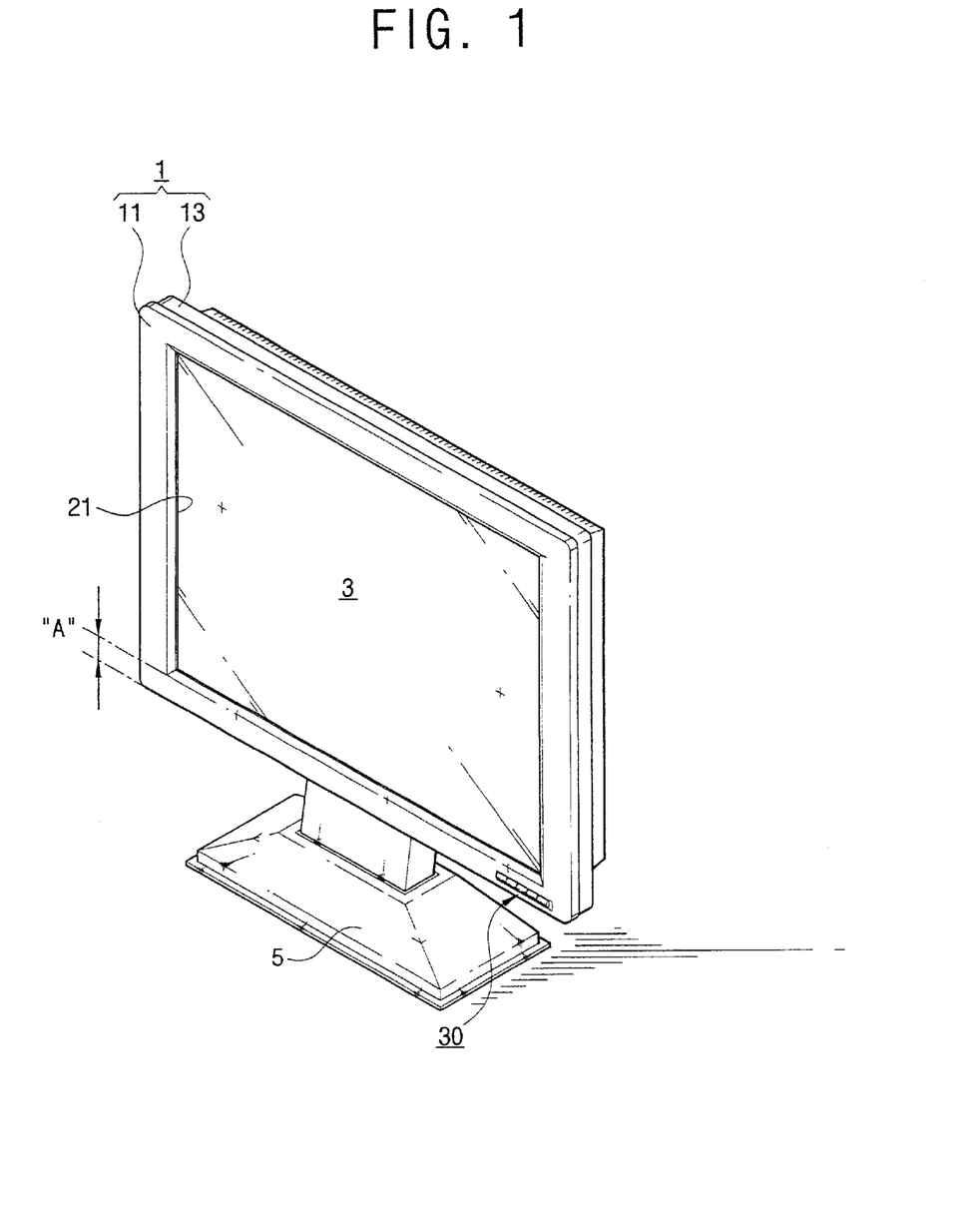
FIG. 1 is a perspective view of a displaying apparatus constructed according to the present invention.

FIG. 1 is a perspective view of a displaying apparatus, such as a liquid crystal display device (LCD) monitor, mounted with an on screen display (OSD) controller assembly. The displaying apparatus includes a cover casing 1 defining an outer appearance of the displaying apparatus, an LCD panel 3 enclosed in cover casing 1 and displaying a visual image thereon, and a stand 5 supporting a lower part of cover casing 1.

Cover casing 1 includes a front cover 11 and a rear cover 13 coupled to a rear side of front cover 11 for forming a space between front cover 11 and rear cover 13 for accommodating LCD panel 3 therein. Front cover 11 is formed with an opening 21 through which a display screen of a front surface of LCD panel 3 displaying the visual image is exposed to the outside of cover casing 1 of the displaying apparatus. A peripheral side is formed around opening 21 of front cover 11.

Figure 2:
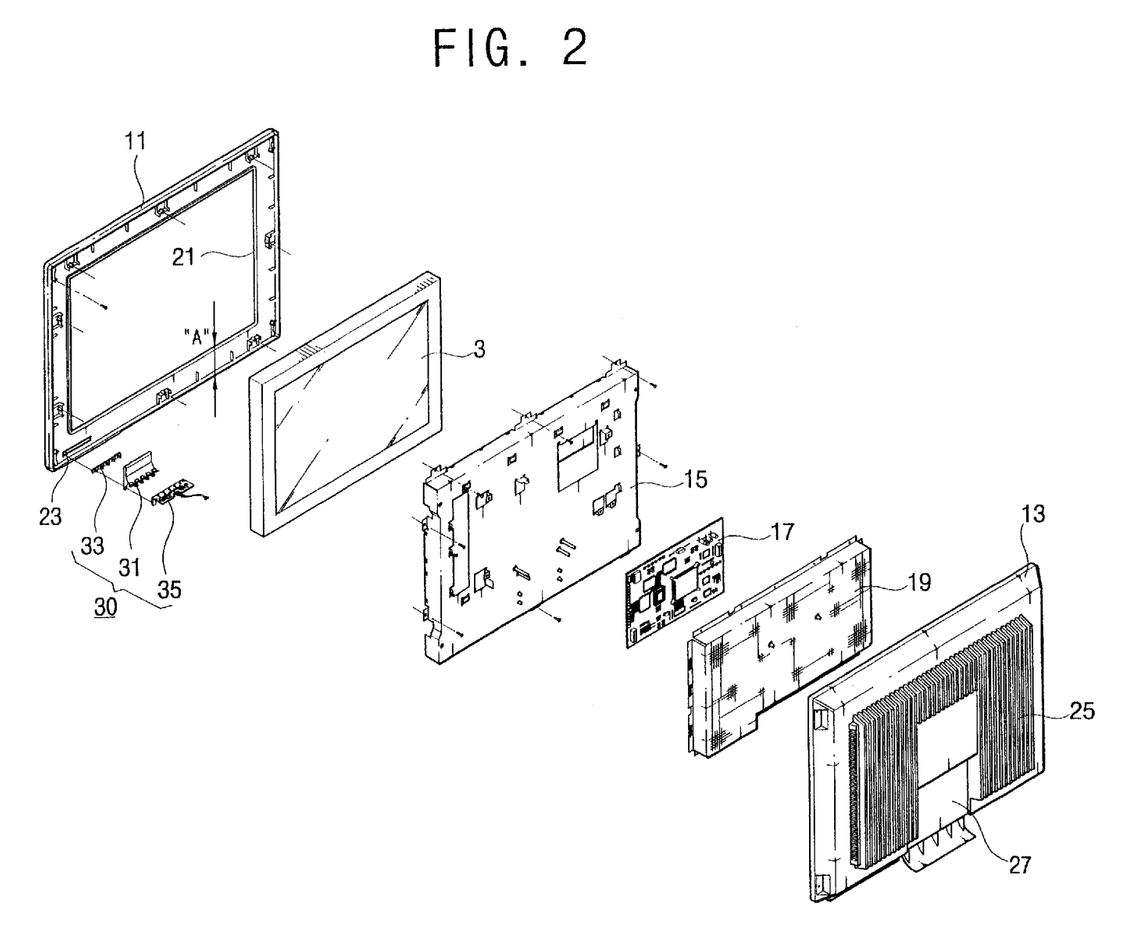
FIG. 2 is an exploded perspective view of the displaying apparatus of FIG. 1.

A knob passing hole 23 is formed on the peripheral side of front cover 11 below opening 21 as shown in FIG. 2. A plurality of press knobs 33 is inserted into knob passing hole 23 so as to be exposed from front cover 11. Rear cover 13 is formed with air inlet slots 25 through which outdoor air flows into an inside of cover casing 1, and a terminal receptacle 27 providing a passage for a variety of peripherals and connection wires.

A panel bracket 15 is coupled to front cover 11 to support LCD panel 3. A main PCB unit 17 is disposed between panel bracket 15 and a main PCB cover 19 to be coupled to LCD panel 3 to transmit electronic signals to LCD panel 3. Panel bracket 15 encloses cylindrical and rectangular outer circumferential sides and a rear surface of LCD panel 3 for supporting LCD panel 3. Main PCB unit 17 is coupled to a rear surface of panel bracket 15, and main PCB cover 19 is coupled to panel bracket 15 to enclose main PCB unit 17.

Figure 3:
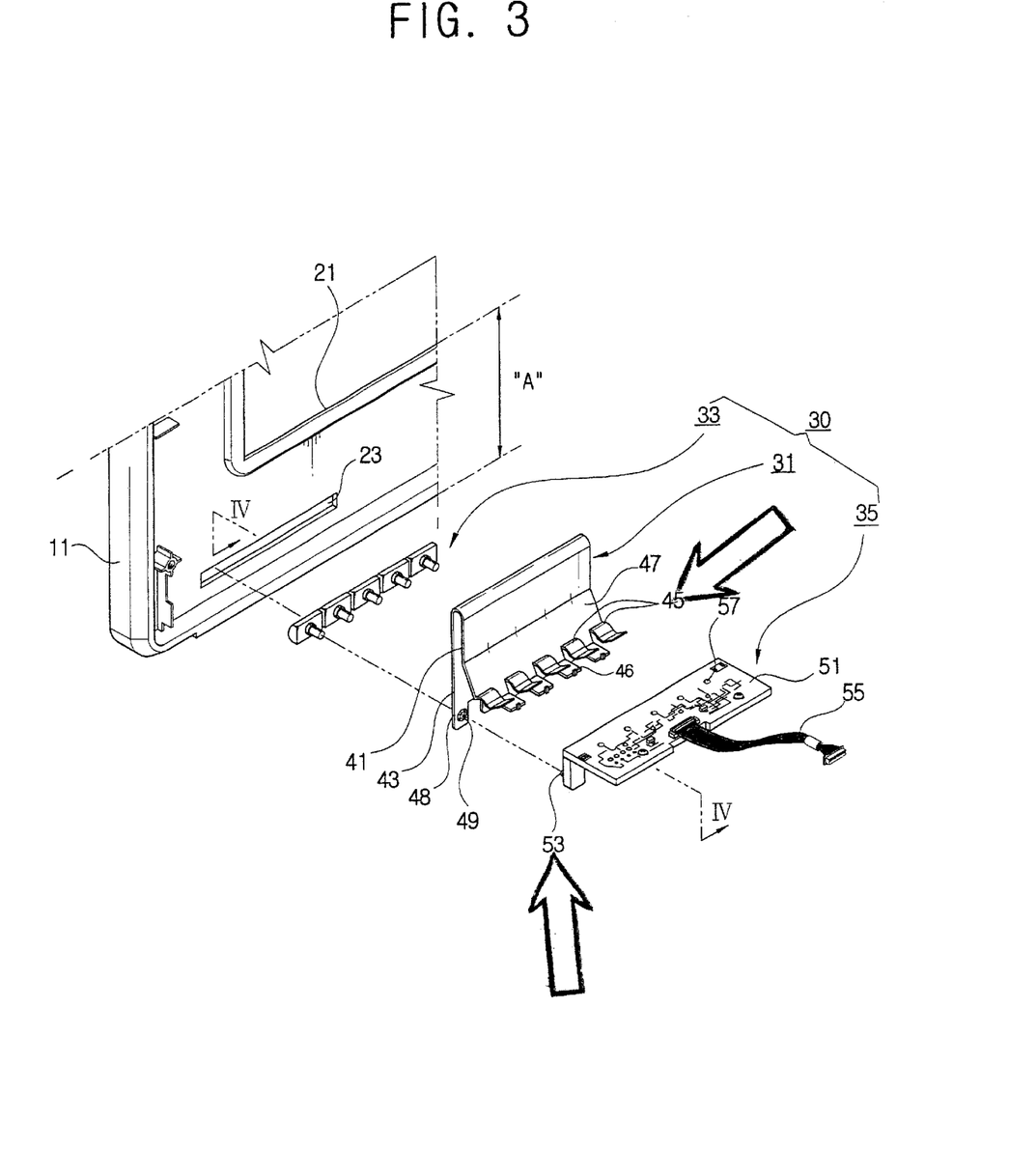
FIG. 3 is a partially enlarged perspective view showing a main portion of an OSD controller assembly of FIG. 2.

OSD controller assembly 30 is disposed between the peripheral side of front cover 11 disposed below opening 21 and a front surface of LCD panel 3 facing the peripheral side of front cover 11. OSD controller assembly 30 includes a support bracket 31 having a coupling member 41, a knob support 43, and an OSD PCB support 45 as shown in FIG. 3. Knob support 43 is formed on one end of coupling member 41 while OSD PCB support 45 is formed on another end of coupling member 41 opposite to knob support 43. A plurality of press knobs 33 is coupled to a knob support 43 of support bracket 31, and knobs 33 have a front edge thereof exposed to the outside of the displaying apparatus through knob passing hole 23 of front cover 11, while an OSD PCB unit 35 is coupled to OSD PCB support 45 of support bracket 31.

Figure 4A:
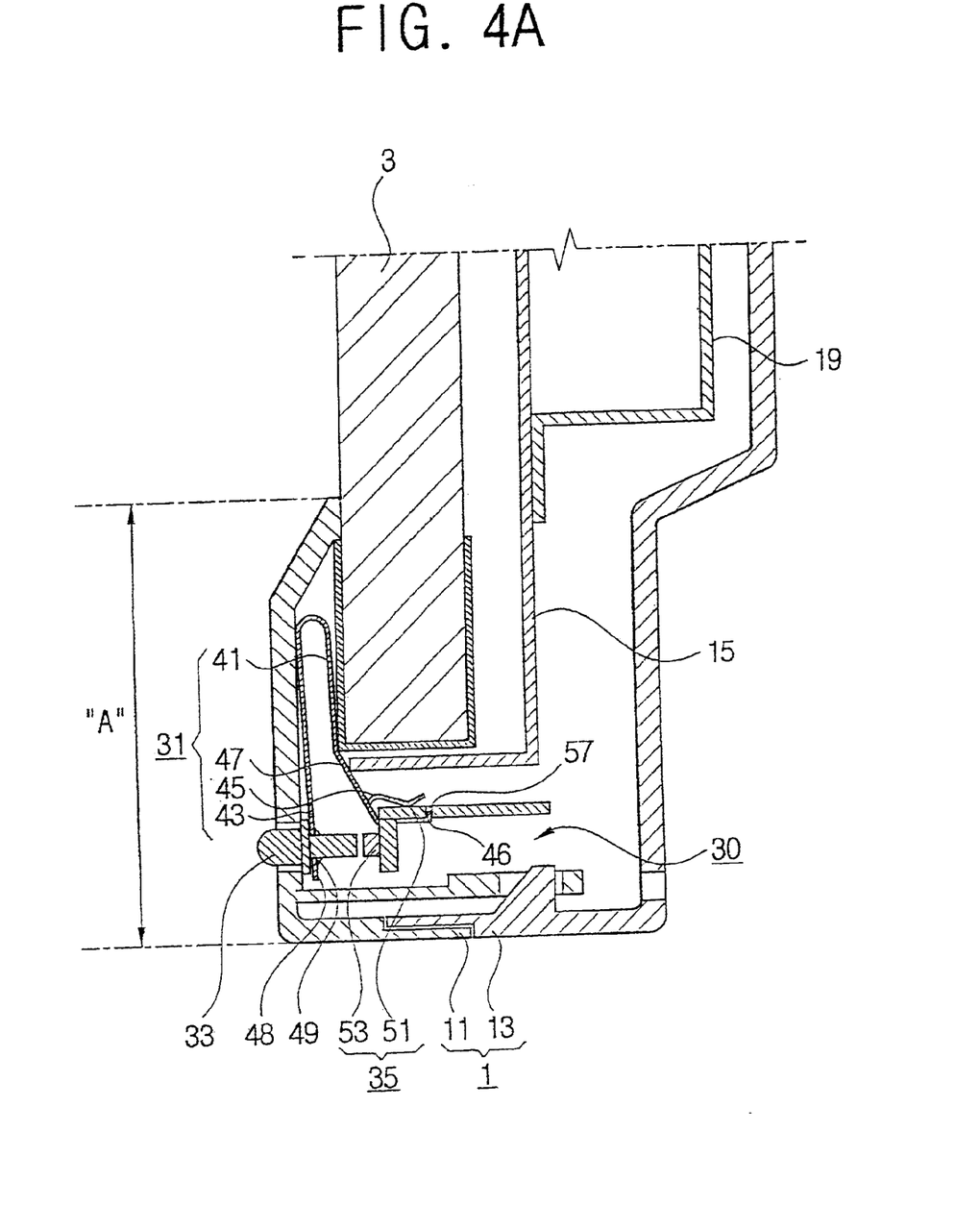
FIG. 4A is a partial cross-sectional view taken along a line IV—IV of FIG. 3.
Figure 4B:
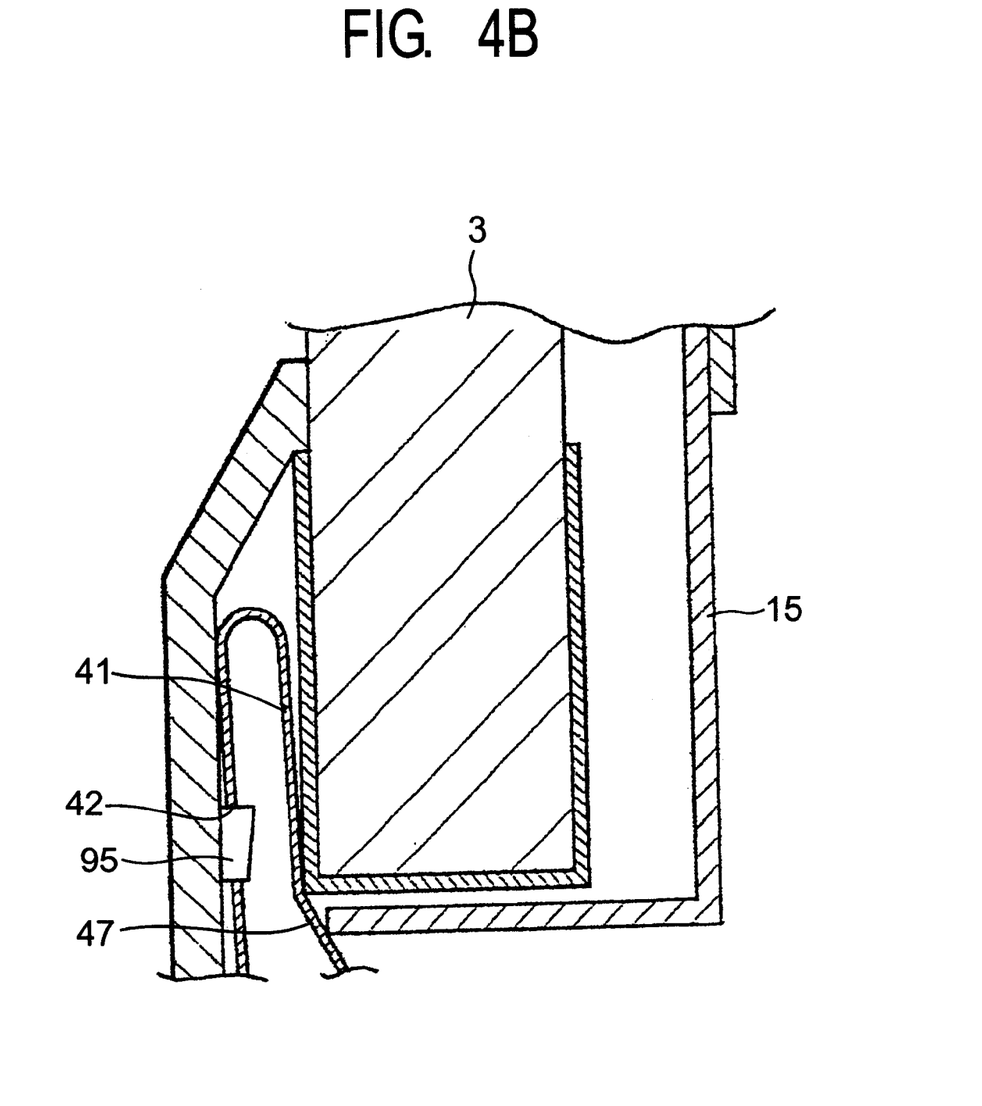
FIG. 4B is a partial cross-sectional view showing the coupling between a front cover and a coupling member of a support bracket.
Figure 5:
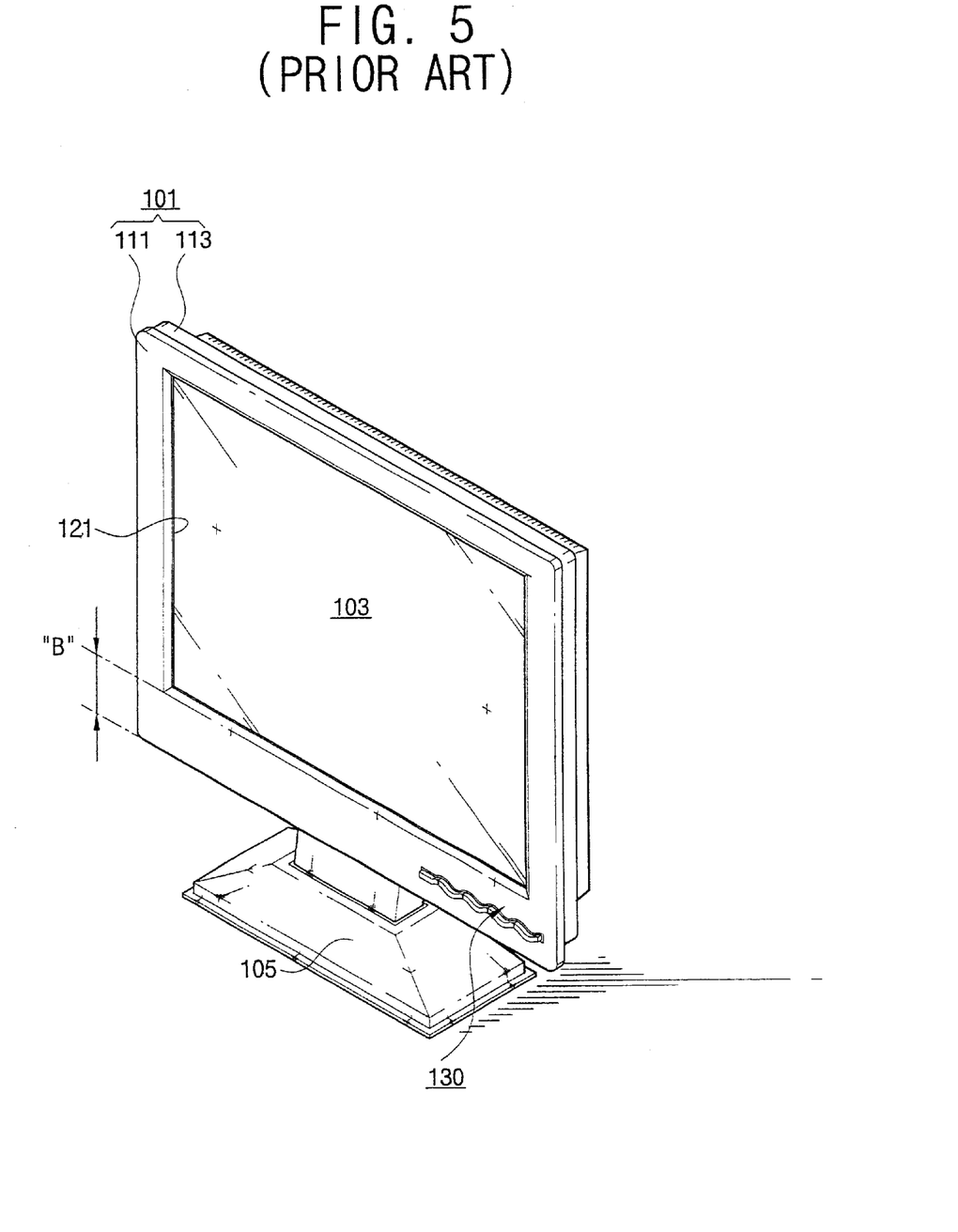
FIG. 5 is a perspective view showing a conventional displaying apparatus.

Coupling member 41 having a ∩ shape is disposed between the peripheral side of front cover 11 and the front surface of LCD panel 3 so as to be coupled to front cover 11 and LCD panel 3 as shown in FIGS. 3, 4A, and 4B. Both ends of coupling member 41 are spaced-apart from each other and biased outwardly. When coupling member 41 is inserted between the peripheral side of front cover 11 and the front surface of LCD panel 3, support bracket 31 is fixed to front cover 11 and LCD panel 3 by the outwardly biased elastic force of both ends of coupling member 41.

Knob support 43 extends from one end of coupling member 41 in a direction parallel to the peripheral side of front cover 11, and is disposed adjacent to an inner side of knob passing hole 23 formed on the peripheral side of front cover 11, while OSD PCB support 45 extends from another opposite end of coupling member 41 in a direction perpendicular to the peripheral side of front cover 11 and is spaced-apart from knob support 43 by a predetermined distance.

Both ends of coupling member 41 are biased outwardly and elastically expanded toward front cover 11 and LCD panel 3, respectively. Coupling member 41 may be coupled to front cover 11 and LCD panel 3 or panel bracket 15 by means of a screw or a hook. However, as described above, coupling member 41 is fixed to front cover 11 and LCD panel 3 due to the inherent elastic force of both ends of coupling member 41. Because any additional and separate coupling means, such as a screw, etc., is not necessary, the structure of OSD controller assembly becomes compact and slim, and the assembling process becomes simplified.

In FIG. 4B, a projection 95 is formed on a rear surface of the peripheral side of front cover 11 facing the front surface of LCD panel 3. A hole 42 is formed on coupling member 41 of support bracket 31. Projection 95 is inserted into hole 42 when coupling member 41 is inserted between the peripheral side of front cover 11 and the front surface of LCD panel 3.

Knob support 43 (FIG. 4A) extends downward from one end of coupling member 41. A plurality of elastic extensions 48 extend from knob support 43 and elastically support press knobs 33. A knob coupling hole 49 is formed on each extension 48. Each front end of press knobs 33 is movably inserted into knob passing hole 23 while each rear end of press knobs 33 is coupled to respective knob coupling holes 49 of elastic extensions 48 of knob support 43.

A terminal portion 47 is formed between another end of coupling member 41 and PCB support 45, and is inclined with respect to both LCD panel 3 and a plane passing another end of coupling member 41 in order to contact panel bracket 15 when coupling member 41 is inserted between front cover 11 and LCD panel 3. The static electricity transmitted to support bracket 31 is discharged to panel bracket 15 through terminal portion 47 of support bracket 31.

OSD PCB support 45 extending from terminal portion 47 includes a pair of upper and lower holders horizontally alternatively formed along an elongated end of terminal portion 47. The holders are spaced-apart from each other by a predetermined distance, which is less than the thickness of OSD PCB 51, opened toward OSD PCB 51, and biased inwardly. When OSD PCB 51 is inserted between the holders of OSD PCB support 45, the holders elastically hold and support OSD PCB 51 in a horizontal direction because the holders are biased inwardly. A protrusion 46 vertically formed on an end portion of one of the lower and upper holders of OSD PCB support 45 is inserted into a groove 57 formed on OSD PCB 51 for preventing PCB assembly 35 from being detached from the holders of support bracket 31 of OSD controller assembly 30 when OSD PCB 51 is inserted between the holders of PCB support 45.

Terminal portion 47, formed between coupling member 41 and OSD PCB support 45, contacts panel bracket 15 by the elastic force of coupling member 41 when coupling member 41 is inserted between the peripheral side of front cover 11 and the front surface of LCD panel 3. Static electricity is discharged to panel bracket 15, which functions as a ground. With this configuration, there is no need to provide the additional ground wire of FIG. 8 to couple coupling member 41 to panel bracket 15 for preventing OSD PCB 51 from being damaged.

Support bracket 31 is press-molded from a single metal plate. After knob support 43 and OSD PCB support 45 are formed on respective opposite ends of the metal plate, the metal plate is bent to form the U shaped coupling member 41 of support bracket 31. Knob support 43 and OSD PCB support 45 are separated from each other and spaced-apart from each other. Both ends of coupling member 41 are spaced-apart from each other by a predetermined distance greater than a distance between the peripheral side of front cover 11 and the front surface of LCD panel 3. Holders of OSD PCB support 45 are disposed below a bottom of cylindrical rectangular sides of LCD panel 3, and OSD PCB 51 is disposed below and parallel to the bottom of LCD panel 3. OSD PCB 51 is coupled to the holders of OSD PCB support 45 of support bracket 31 in a direction parallel to a bottom of circumferential cylindrical sides of LCD panel 3 and perpendicular to the peripheral side of front cover 11 and the front surface of LCD panel 3.

A plurality of switches 53 is provided lengthwise in front of OSD PCB 51 and along an elongated end of OSD PCB 51 parallel to the peripheral side of front cover 11, and are spaced-apart from each other. Switches 53 are disposed to contact press knobs 33 when press knobs 33 move in a direction parallel to OSD PCB 51. A connection cable 55 for transmitting signals between switches 53 and main PCB unit 17 is coupled between OSD PCB 51 and main PCB unit 17.

Since OSD PCB 51 of OSD PCB unit 35 is horizontally supported in OSD PCB support 45 of support bracket 31, OSD PCB 51 is disposed along and parallel to a bottom side of the cylindrical and rectangular circumferential sides side of LCD panel 3, is disposed perpendicular to both front cover 11 and knob support 43, and is parallel to the direction in which press knobs 33 move to contact respective switches 53 of OSD PCB 51. Switches 53 are provided in a front lower face of OSD PCB 51 so as to be activated by the rear end of press knobs 33, thereby generating the signals to be transmitted from OSD PCB 51 to main PCB unit 17 through connection cable 55.

Since OSD PCB 51 of OSD PCB unit 35 is horizontally held by support bracket 31 in the lower portion of front cover 11, switches 53 are in contact with respective press knobs 31 arranged in front of OSD PCB 51. Therefore, the space for installing OSD PCB unit 35 is reduced. The lower portion of the peripheral side of the front cover 11, indicated by "A" in FIGS. 1 thru 4 is minimized in width and less than the length B, as indicated in FIG. 8, thereby making an outer appearance of the displaying apparatus slim and compact in design.

An insulation area of OSD PCB 51 is held in OSD PCB support 45, thereby preventing OSD PCB unit 35 from being damaged due to static electricity transmitted from the outside of the displaying apparatus. Any non-insulation area of the printed conductor section of OSD PCB 51 does not contact OSD PCB support 45 while the insulation area contacts OSD PCB support 45.

When the protrusions 46 are inserted into respective grooves 57, OSD PCB 51 is prevented from being detached from OSD PCB support 45 in a direction parallel to the main surface of OSD PCB 51. Moreover, OSD PCB 51 is prevented from being detached from OSD PCB support 45 in the vertical direction and the horizontal direction when holders of OSD PCB support 45 support OSD PCB 51. Thus, when the user operates switches 53 through press knob 33, the coupling between protrusions 46 and grooves 57 prevents OSD PCB unit 35 from being detached from OSD PCB support 45 in the horizontal direction while OSD PCB unit 35 is prevented from being detached in the vertical direction because of the holders. The assembling process of OSD controller assembly is completed.

The assembling process of the displaying apparatus and OSD controller assembly is described as follows. The rear ends of press knobs 33 are inserted into knob coupling holes 49 of extensions 48 while the front ends of press knobs 33 are exposed to the outside of front cover 11 through knob passing hole 23. Coupling member 41 of support bracket 31 is inserted between front cover 11 and LCD panel 3 after press knobs 33 are coupled to respective knob coupling holes 49 and inserted into knob passing hole 23.

After panel bracket 15 is coupled to the rear side of front cover 11 so as to enclose LCD panel 3, coupling member 41 of support bracket 31 is inserted between the peripheral side of front cover 11 and LCD panel 3 so as to securely couple support bracket 31 to both front cover 11 and LCD panel 3. Since both ends of coupling member 41 are biased outward and expanded toward front cover 11 and LCD panel 3, respectively, coupling member 41 is fixedly coupled between front cover 11 and LCD panel 3 by the elastic force of coupling member 41. Terminal portion 47, extending outwardly from another end of coupling member 41, contacts panel bracket 15 due to the outward elastic force of coupling member 41.

The front insulation area formed on OSD PCB 51 is inserted between holders of OSD PCB support 45 of support bracket 31. OSD PCB 51 is held in OSD PCB support 45 in the horizontal direction, and at the same time, protrusions 46 are inserted into respective grooves 57. Thus, OSD PCB 51 is securely supported in the horizontal direction parallel to OSD PCB support 45, and simultaneously switches 53 mounted on OSD PCB 51 are disposed to contact the rear end of respective press knobs 33.

After OSD controller assembly 30 is assembled, main PCB unit 17 is coupled to the rear surface of panel bracket 15, and connection cable 55 coupled to OSD PCB unit 35 of OSD controller assembly 30 is connected to main PCB unit 17. Main PCB cover 19 is coupled to the rear surface of panel bracket 15 to enclose main PCB unit 17, and then, rear cover 13 is coupled to front cover 11. The assembling of the displaying apparatus is completed.

As mentioned above, the support bracket 31 supports the press knobs 33 and the OSD PCB units while the coupling member 41 of the support bracket 31 is disposed between the front cover 11 and the LCD panel 3 of the displaying apparatus, thereby minimizing the installation space for the OSD controller assembly. With this configuration, the outer appearance of the displaying apparatus becomes slim and compact in design.

Since the press knobs 33 and the OSD PCB unit 35 are easily coupled to the support bracket 31 while the coupling member 41 of the support bracket 31 is coupled between the front cover 11 and the LCD panel 3, the OSD controller assembly can be simply manufactured without using an additional and separate coupling means, such as screws, etc.

Since the inclined portion as a ground terminal or terminal portion 47 is formed between the coupling member 41 and the OSD PCB support 45 to elastically contact the panel bracket 15, there is no need to prepare an additional ground wire. Therefore, the number of components for the ground is reduced, and the assembling process is simplified.

As described above, there is provided a displaying apparatus having a slim and compact appearance and manufactured with a simplified assembling process owing to reduction in the number of parts.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An assembly in a displaying apparatus, comprising:
   a housing including a front cover having an opening, and a rear cover attached to said front cover;
   a display panel disposed between said front cover and said rear cover, and having a screen exposed to an outside of said housing through said opening;
   a slot formed on a peripheral side of said front cover around said opening;
   at least one knob having a front end movably inserted into said slot;
   a panel bracket disposed between said display panel and said rear cover, and coupled to said front cover to enclose and support said display panel;
   a support bracket disposed within said displaying apparatus, and having a coupling member disposed between said peripheral side of said front cover and a front surface of said display panel facing said peripheral side of said front cover, said support bracket having a knob support extending from one end of said coupling member and disposed adjacent to said slot so as to be coupled to a rear end of said at least one knob to support said at least one knob while a front end of said at least one knob is inserted into said slot, and having a printed circuit board (PCB) support extending from another end of said coupling member; and
   an on screen display (OSD) PCB coupled to said PCB support of said support bracket and held in a direction perpendicular to said peripheral side of said front cover.

2. The assembly of claim 1, said coupling member of said support bracket having a shape of "109" and having distal ends which are elastically biased outwardly and spaced-apart from each other by a distance less than a thickness of said OSD PCB.

3. The assembly of claim 1, said PCB support comprising an upper holder and a lower holder both extending from, and formed alternatively along, said another end of said PCB support, said upper and lower holders being spaced-apart from each other and biased inwardly to hold said OSD PCB in a direction parallel to a bottom of cylindrical and rectangular circumferential sides of said LCD panel.

4. The assembly of claim 3, wherein said OSD PCB is inserted between said upper holder and said lower holder of said PCB support and supported in parallel to a direction in which said at least one knob moves.

5. The assembly of claim 1, further comprising a terminal portion formed between said another end of said coupling member and said PCB support, and contacting said panel bracket when said coupling member is inserted between said front cover and said display panel.

6. The assembly of claim 5, said terminal portion having an angle with respect to a plane of said another end of said coupling member.

7. The assembly of claim 1, further comprising an insulation area formed on said OSD PCB and coupled to said PCB support, said insulation area contacting said PCB support while a non-insulation area of said OSD PCB does not contact said PCB support.

8. The assembly of claim 1, said support bracket being made in a single metal plate.

9. The assembly of claim 1, said at least one knob being inserted into said slot, being coupled to said knob support, and moving in a direction parallel to a main plane of said OSD PCB which is disposed perpendicular to said peripheral front side of said front cover and parallel to a bottom of said display panel.

10. The assembly of claim 1, further comprising a switch mounted on said OSD PCB, said switch contacting said at least one knob and being activated by said at least one knob moving in a direction parallel to said OSD PCB.

11. The assembly of claim 1, further comprising a main PCB disposed between said panel bracket and said rear cover and coupled to said display panel and said panel bracket, said main PCB being disposed perpendicular to said OSD PCB and parallel to said display panel.

12. The assembly of claim 1, wherein said knob support is parallel to a plane of said one end of said coupling member while said PCB support is perpendicular to a plane of said another end of said coupling member.

13. The assembly of claim 1, further comprising:
   a projection formed on said peripheral side of said front cover, and protruding toward said front surface of said display panel; and
   a hole formed on said coupling member, said projection being inserted into said hole when said coupling member is inserted between said front cover and said display panel.

14. An assembly in a displaying apparatus, comprising:
   a housing having a front cover and a rear cover coupled to said front cover;
   a display panel disposed within said housing;
   a slot formed on a peripheral side of said front cover;
   at least one press knob movably inserted into said slot; and
   a support bracket disposed within said housing, and having a coupling member disposed between said peripheral side of said front cover and a front surface of said display panel facing said peripheral side of said front cover, said coupling member having two opposite ends spaced apart from each other, said support bracket having a knob support extending from one end of said coupling member in a first direction parallel to a plane of said one end of said coupling member and disposed adjacent to said slot to be coupled to said at least one press knob, said support bracket having a printed circuit board (PCB) support extending from another end of said coupling member in a second direction different from said first direction.

15. The assembly of claim 14, further comprising:
   a panel bracket disposed between said display panel and said rear cover, and coupled to said front cover to support said display panel; and
   a terminal portion formed between said another end and said PCB support, said terminal portion being slanted toward said panel bracket to contact said panel bracket when said coupling member is inserted between said peripheral side of said front cover and said front surface of said display panel.

16. The assembly of claim 14, further comprising:

an on screen display (OSD) PCB coupled to said PCB support and disposed parallel to a bottom surface of cylindrical rectangular sides of said display panel, said OSD PCB being perpendicular to said front cover; and a switch mounted on said OSD PCB, disposed to be activated by said knob moving in a direction parallel to said OSD PCB.

17. A process for a displaying apparatus which includes a front cover having a slot, a rear cover attached to said front cover, a display panel disposed between said front cover and said rear cover, and a knob movably inserted into said slot, said process comprising the steps of:

providing a bracket including a coupling member, a knob support extending from one end of said coupling member, and a printed circuit board (PCB) support extending from another end of said coupling member;

inserting said coupling member between a peripheral side of said front cover and a front surface of said display panel facing said peripheral side of said front cover;

coupling said knob to said knob support while said knob is inserted into said slot; and coupling an on screen display (OSD) PCB to said PCB support in a direction perpendicular to said peripheral side of said front cover.

18. The process of claim 17, further comprising the step of holding said OSD PCB in a direction parallel to a bottom of display panel.

19. The process of claim 17, further comprising the step of holding said OSD PCB parallel to a direction in which said knob moves.

20. The process of claim 17, further comprising the step of providing a terminal portion formed between said another end of said coupling member and said PCB support, said terminal portion being in contact with a panel bracket of said displaying apparatus.

21. The process of claim 17, further comprising the step of providing an insulation portion and a non-insulation portion formed on said OSD PCB, said insulation portion being inserted into and contacting said PCB support while said non-insulation portion does not contact said PCB support.

* * * * *